March 2, 1948. W. THORPE 2,436,836
INFORMATION POSTING BOARD
Filed Dec. 19, 1945 5 Sheets-Sheet 1
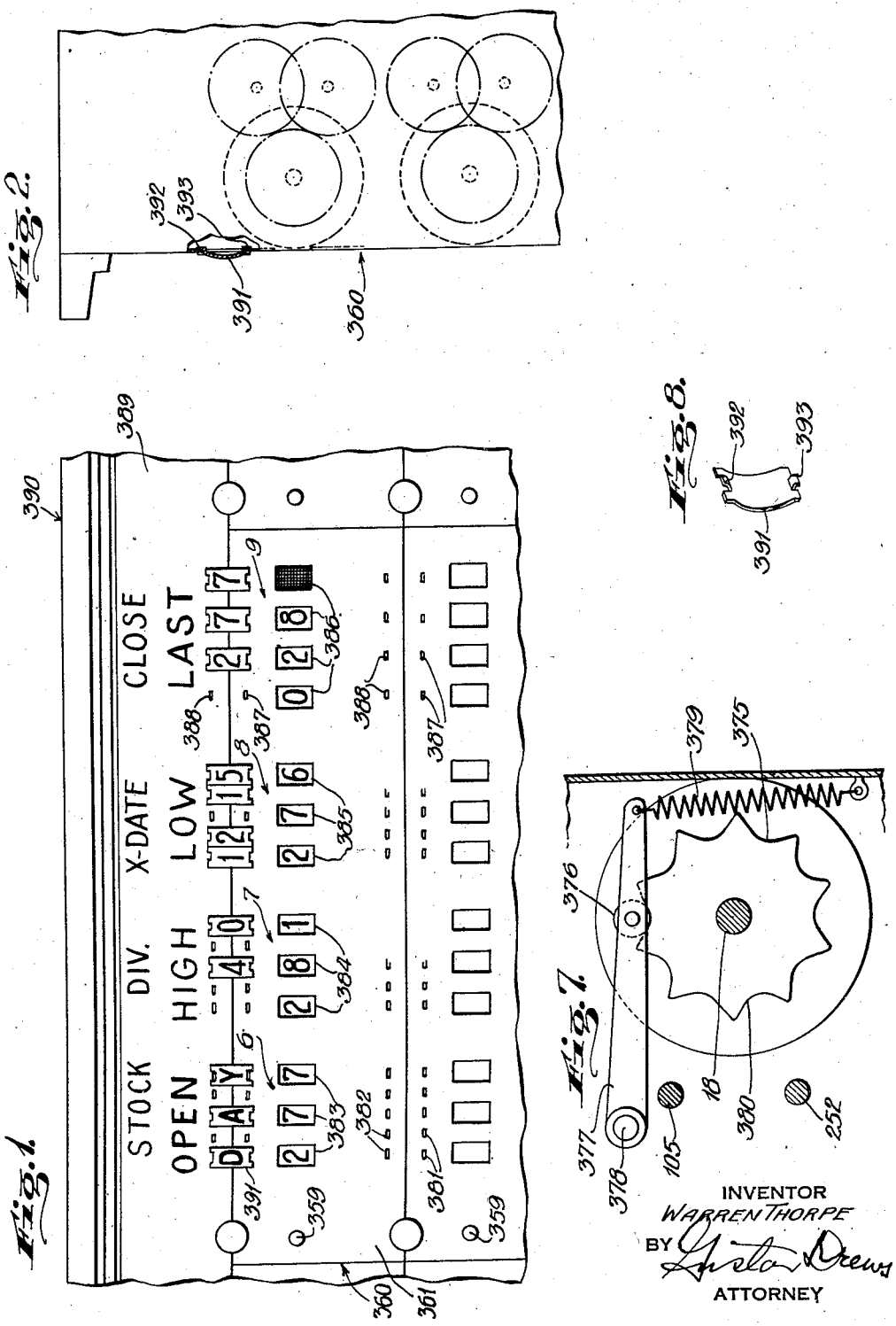

March 2, 1948. W. THORPE 2,436,836
INFORMATION POSTING BOARD
Filed Dec. 19, 1945 5 Sheets-Sheet 2
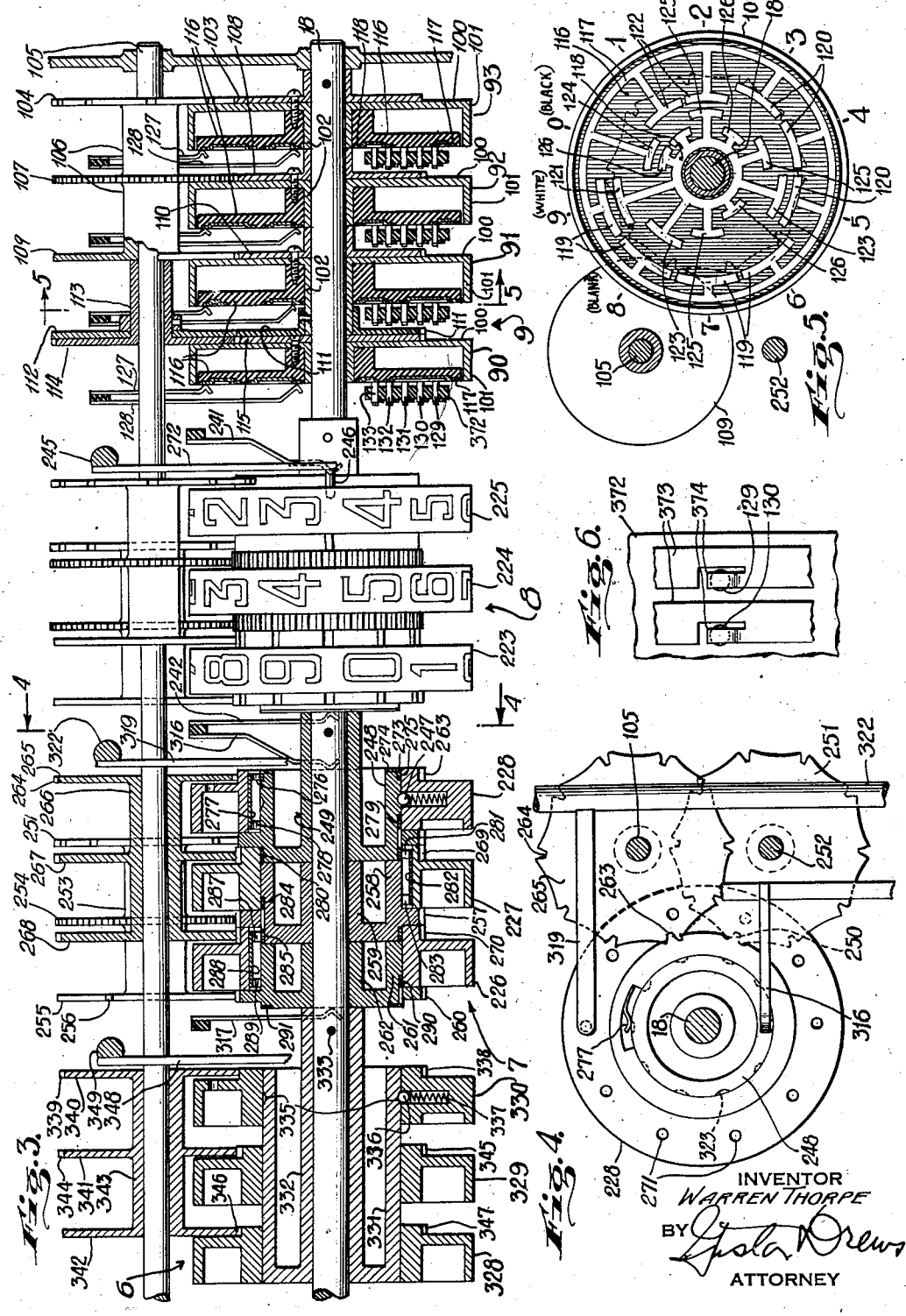

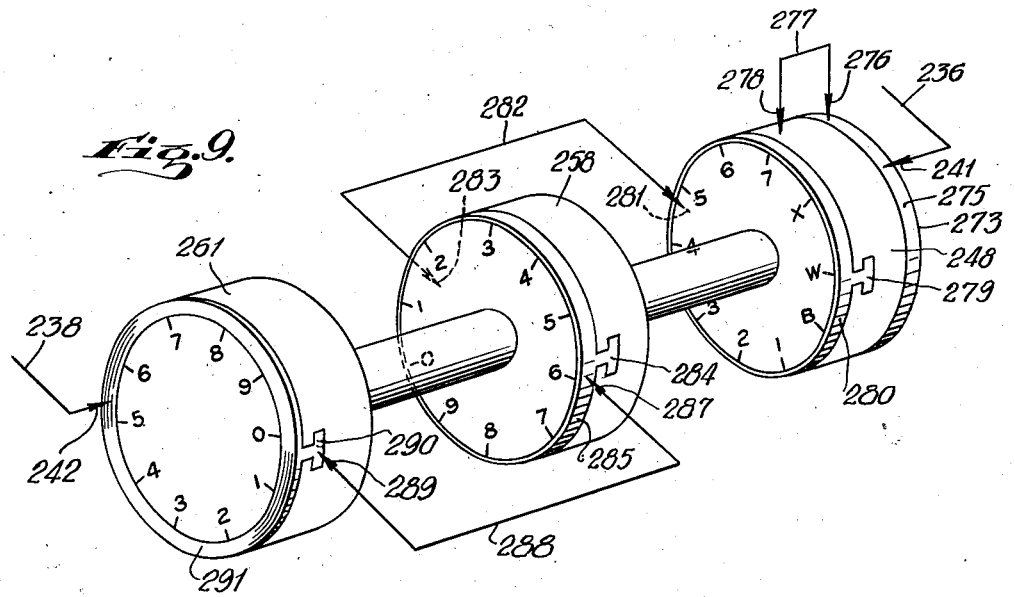
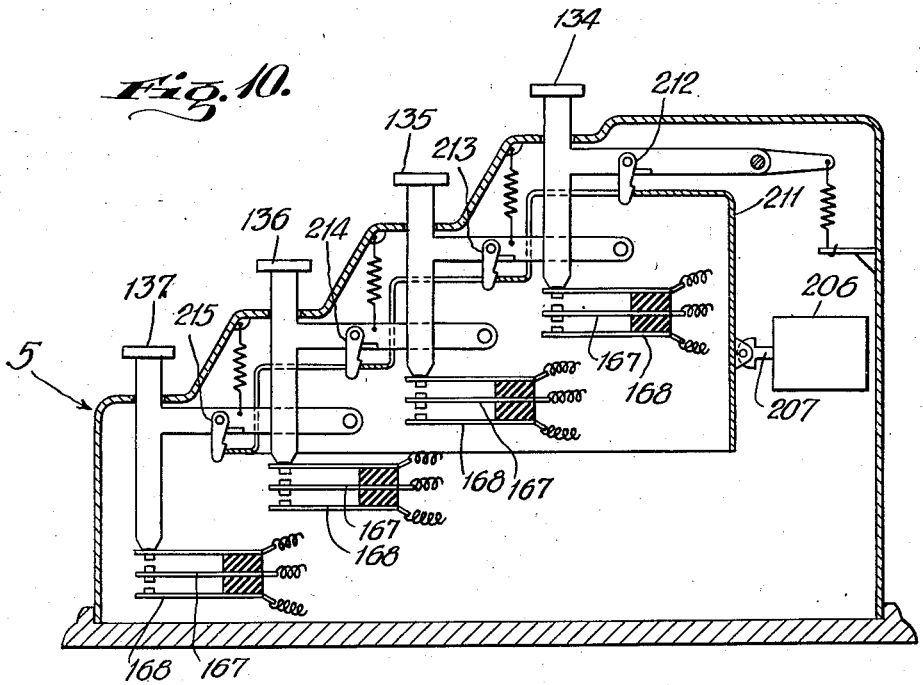

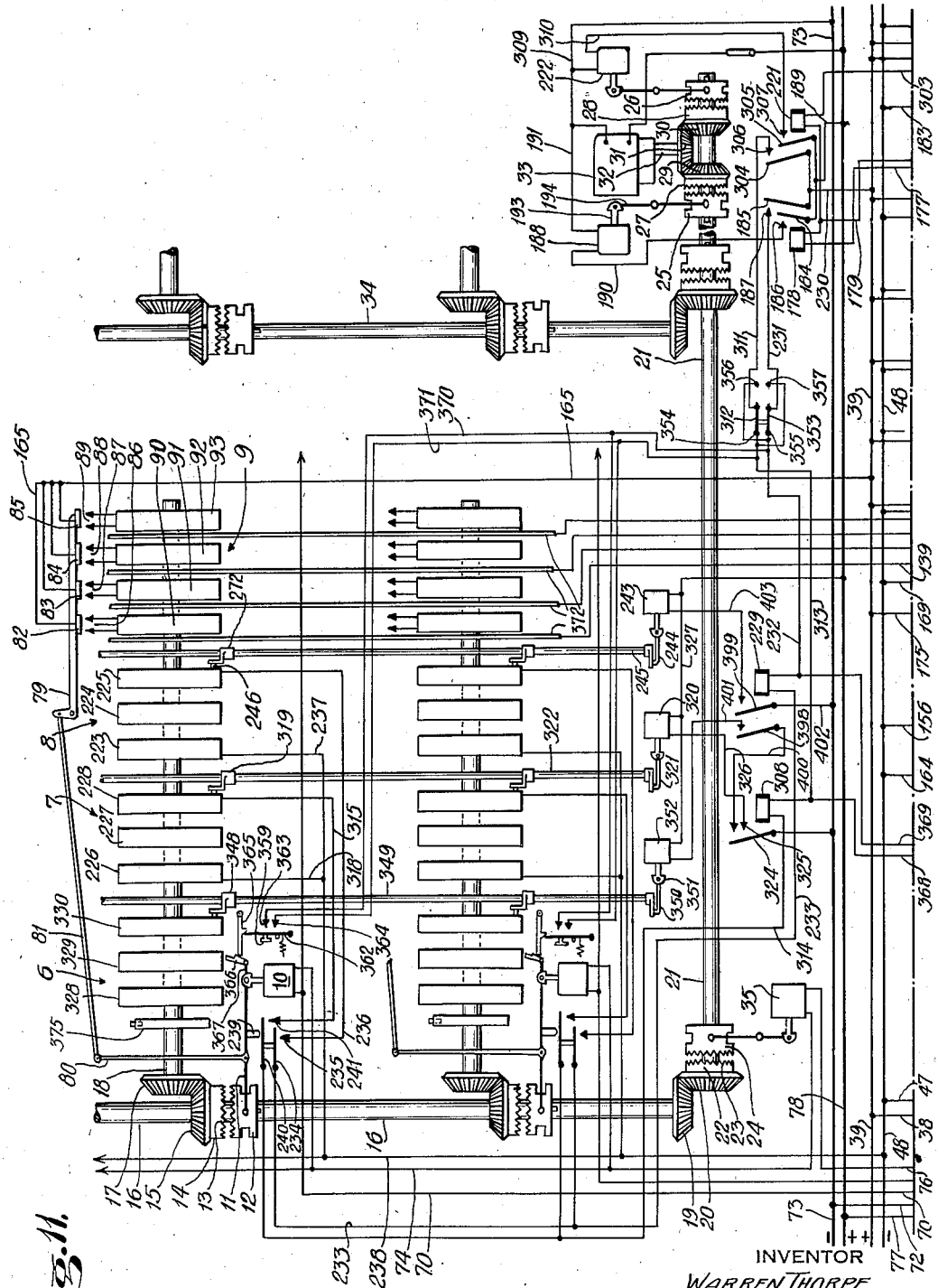

March 2, 1948.  W. THORPE  2,436,836
INFORMATION POSTING BOARD
Filed Dec. 19, 1945  5 Sheets-Sheet 5

INVENTOR
WARREN THORPE
BY Gusta Drewy
ATTORNEY

Patented Mar. 2, 1948

2,436,836

UNITED STATES PATENT OFFICE 2,436,836

INFORMATION POSTING BOARD

Warren Thorpe, Lawrence, N. Y.

Application December 19, 1945, Serial No. 635,966

17 Claims. (Cl. 177—353)

This invention relates to record posting machines in general, and more particularly to stock quotation posting machines.

Among the objects of the present invention, it is aimed to provide an improved record posting machine whereby an attendant can quickly post or report changing records of a large number of items, so that if the board is being used for returns of an election, as the returns are received the attendant can quickly record and post the constantly changing returns, and in turn, if the machine is used for posting the quotations of a stock market, the constantly changing quotations of a large number of stocks can be quickly recorded or posted by one attendant.

It is still another object of the present invention to provide an improved record posting machine, particularly adapted for posting the changing quotations of a stock market whereby one and the same attendant can immediately post not only the last quotation of a large number of stocks, but whereby the high quotation and low quotation of a trading period or trading day will automatically be posted whenever the last quotation is the high or the low of the day.

It is still another object of the present invention to provide an improved stock quotation posting machine which can, with facility, be cleared before the opening of a trading day, automatically record or post the opening quotation as the first quotation of any stock is posted, and thereupon leave the opening quotation in displaying position for the remainder of a trading period or trading day while the remaining quotation wheels for the high, low and last are being operated during the remainder of the trading period or day, without thereafter changing or affecting the price displayed by the opening quotation wheels.

These and other features, capabilities and advantages of the invention will appear from the subjoined detail description of one specific embodiment thereof illustrated in the accompanying drawings, in which Fig. 1 is a fragmental front elevation of a stock quotation board.

Fig. 2 is a fragmental end elevation of the same partly broken away.

Fig. 3 is a fragmental plan partly in section of a set of quotation wheels.

Fig. 4 is a section on the line 4—4 of Fig. 3.

Fig. 5 is a section on the line 5—5 of Fig. 3.

Fig. 6 is an enlarged fragmental detail of parts of the conductors.

Fig. 7 is a fragmental detail showing the anchoring means for the quotation wheels.

Fig. 8 is a perspective of one of the indicia clips.

Fig. 9 is a perspective diagrammatically showing the wiring of the high and low quotation wheels.

Fig. 10 is an enlarged end elevation partly in section of the numeral key board.

Figs. 11 and 12 are the upper and lower halves diagrammatically showing the wiring for controlling the several record posting wheels.

Figure 12:
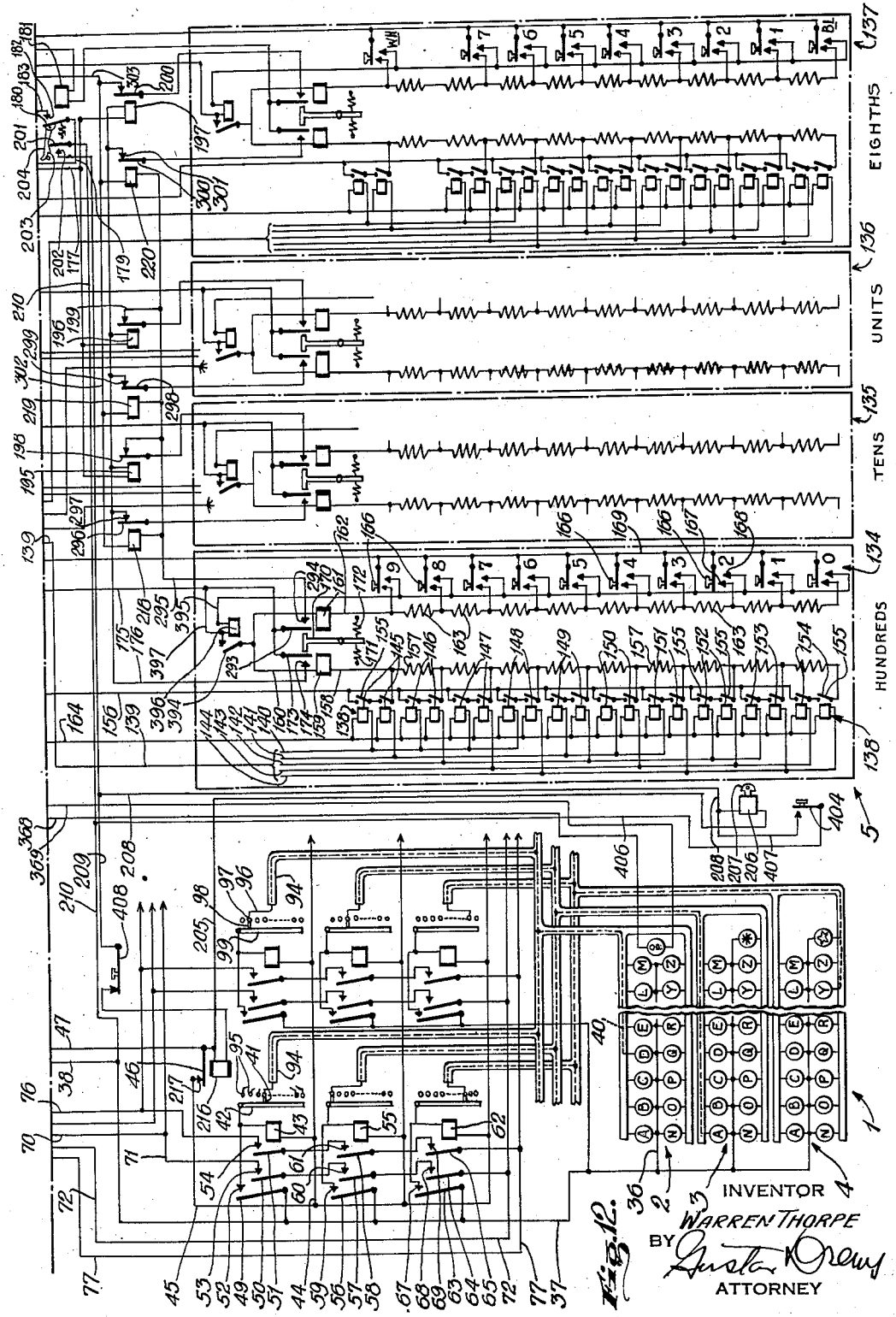

The record posting machine constituting the main part of this invention may in part be used for posting the returns of an election, as an instance, or the records of airplane flights or pari-mutuel records, or the quotations of a stock market. The specific embodiment here illustrated is particularly adapted for posting and recording the quotations of a stock market, such as the "Open," "High," "Low" and "Last," referring to the opening quotation, highest quotation of the day, lowest quotation of the day and last or current quotation of the day. These designations "Open," "High," "Low" and "Last" are extensively used in the brokers' offices throughout the United States.

The present machine consists essentially of a posting or quotation board divided into a number of areas, depending upon the number of stocks to be reported through this board. It is quite common with these boards, when used for posting stock quotations, to provide areas for at least one hundred fifty stocks. It is believed practical with the present board to provide as many areas for as many different stocks as are required.

The machine, for the purpose of description, may be conveniently divided into several topics, more or less arbitrarily chosen, as an instance, the stock selector, the mechanism for setting the last quotation, the mechanism for setting either the high or low quotation, and the mechanism for setting the board before the opening of a trading day, to enable recording the opening quotation.

Briefly, the machine will include a lettering or an alphabetical keyboard device such as the keyboard 1 having three separate keyboards 2, 3 and 4, the keyboards of which will be operated to select the stock for which the quotation is to be posted.

In addition, the machine also has a second keyboard consisting only of numerals, such as the keyboard 5, which is common to all of the stocks and will be operated only after the stock has been selected.

According to the mechanism hereinafter to be described, with the first quotation, all of the number wheels of the particular stock, see Fig. 1, will be set to post the first quotation for each report, to wit, below each of the words "Open," "High," "Low" and "Last." Thereupon, if for this stock the next quotation is higher than the opening quotation, only the number wheels under the words "High" and "Last" will change. If, thereupon, the third quotation of the day is lower than the opening quotation, then only the number wheels under the words "Low" and "Last"

will be actuated to record this low quotation. By this mechanism, the number wheels under the word "Last" will be operated with each succeeding quotation if it differs from a previous quotation. The number wheels under the word "Open" will not change after the initial quotation. The number wheels under the word "High" will only change when a quotation is to be recorded that is higher than any previously recorded quotation and the number wheels under the word "Low" will only be operated when the current quotation is lower than any previously recorded quotation.

In the interest of clarity, the several main parts of the mechanism will now be described in the order heretofore named.

Stock selector

The wiring diagrams illustrated in Figs. 11 and 12 diagrammatically show the hookup between a keyboard 1 and the stock selected. Assuming that the sets of number wheels 6, 7, 8 and 9 at the upper end of Fig. 11 are connected, as hereinafter to be described, to post or record the quotations of the stock DAY, the symbol for Dayton Rubber Manufacturing Company, then the solenoid 10 is operatively connected by wires when the combination DAY is actuated, that is, when the letter "D" in the key board 2, the letter "A" in the key board 3 and the letter "Y" in the keyboard 4 are actuated. When this solenoid is so energized, it will actuate the lever 11 to shift the clutch element 12 which is splined to shaft 16 into clutching engagement with the face 13 of the collar 14 on the beveled gear 15 which is free on the shaft 16 and which beveled gear 15 in turn is in mesh with the beveled gear 17 on the shaft 18 on which the sets of number wheels 6, 7, 8 and 9 are rotatably mounted.

The shaft 16, in the present instance, at its lower end is provided with a beveled gear 19 in mesh with beveled gear 20, freely mounted on the shaft 21, the beveled gear 20 having the collar 22 provided with a clutch face 23 to engage the clutch face of the clutch 24. The shaft 21 in turn has slidably mounted thereon, but fixed to rotate therewith, the two clutch units 25 and 26 mounted to cooperate with the clutch collars 27 and 28, respectively, rotatably mounted on the shaft 21. The clutch elements 27 and 28 are provided with beveled gears 29 and 30, respectively, in mesh with the beveled gear 31 mounted on the shaft 32 of the motor 33.

When the clutch 12 engages the collar 14, the clutch 24 engages the collar 23 and the clutch 25 engages the collar 27, then the shaft 21 will be actuated in one direction by the motor 33. On the other hand, if instead of the clutch 25 being in engagement with the clutch collar 27, the clutch 26 is in engagement with the clutch collar 28, then the shaft 21 will be rotated in the opposite direction by the motor 33. The shaft 21 is mounted at the lower end of the board and is common to all of the vertically extending shafts, such as the shafts 16, 34 and others, depending upon the number of columns of stock areas provided.

While the columnar solenoid 35 for the clutch 24 will be energized whenever the solenoid of any of the stocks selected is energized, only the solenoid associated with the particular stock selected, such as the solenoid 10, will be energized at any one time. In the present instance, it is assumed that the solenoid 10 as aforesaid will respond to the combination DAY, that is, when the keys of the letters "D," "A" and "Y" are depressed, forming the ticker symbol of the stock Dayton Rubber Manufacturing Company.

The wiring for the solenoid 10 will now be described. The letter "D" as an instance, is connected by the wire 36 with the wire 37, which is connected by the wire 38 to the return wire 39. The letter "D" is also connected by the wire 40 with the contact 41 of a series of contacts, which is connected to a predetermined wire connected to the bar 42. This predetermined wire, in turn, is connected to the relay 43, which relay 43 is connected by the wire 44 to the wire 45, which may be connected by the switch arm 46 with the wire 47, which in turn is connected to the other return wire 48. When the relay 43 is so energized, it will initially actuate the three-armed switch consisting of the arms 49, 50 and 51 to engage the contacts 52, 53 and 54. Thereupon, when the letter "A" of the key board 3 is depressed, the relay 55 will be energized to actuate the three-armed switch consisting of the arms 56, 57 and 58 to engage the contacts 59, 60 and 61. In turn, when the key representing the letter "Y" of the key board 4 is depressed, the relay 62 will be energized to actuate the three-armed switch 63, 64 and 65 to engage the contacts 67, 68 and 69, respectively.

When these three relays are thus energized, to wit, the relays 43, 55 and 62, then a circuit will be established to the solenoids 10 and 35, the solenoid 10, as an instance, being connected by the wire 70 which is connected by the wire 71 to the switch arms 50, 57 and 64 to the wire 72, which is connected to the main high voltage return wire 73. The other terminal of the solenoid 10, in the present instance, is connected by the wire 74 with the solenoid 35, which in turn is connected by the wire 76 through the switch arms 51, 58 and 65 with the wire 77, which is connected to the other high voltage return wire 78.

When the solenoid 35 is so energized, the shaft 16 is drivingly connected with the common driven shaft 21. At the same time, when the solenoid 10 is energized, the shaft 18 of the number wheels 6, 7, 8, and 9 will be drivingly connected with the shaft 16. At the same time, however, since the lever 11 with its integral arm 80 actuated by the solenoid 10 is connected to the bell crank 79 by the link 81 the contacts 82, 83, 84 and 85 of the four number wheels 9 for the last quotation of the stock selected will be actuated to engage the four sets of contacts 86, 87, 88 and 89.

Up to this time, however, since neither the clutch 25 nor the clutch 26 has been actuated to drivingly connect the shaft 21 with the motor shaft 32, the number wheels 9 will remain at rest.

Not until the numerals constituting the new quotation are set through the keyboard 5 will the shaft 21 be drivingly connected with the motor shaft 32 to actuate the number wheels 9.

The keys of the keyboards 2, 3 and 4 rise immediately after being depressed. However, to maintain the connection, the levers 49, 56 and 63, when brought into contact with their respective contacts 52, 59 and 67 will form a holding circuit for the relays 43, 55 and 62, respectively, enabling the current then to pass through these relays by way of the connection established by the switch arms 49, 56 and 63, without passing through the wiring connection of the keyboards 2, 3 and 4.

The contact 41 connecting the wire 40 with the bar 42 is movably mounted along the bar 42, the wire 40 being only one of twenty-six wires in the cable 94, the other twenty-five wires of which are connected to the remaining letters of the keyboard 2 and connected to the terminals 95. Consequently, if it were desired to replace the "DAY" symbol with another symbol corresponding to another stock, it would only be necessary to shift the movable contact 41 to connect the bar 42 with the desired terminal 95. The wires of this cable 94 however are not solely connected to the control terminals 95 and bus bar 42. As shown in Fig. 12, the several wires of the cable 94 have branches, each extending to every other control bus bar responsive to keyboard 2. For the second stock area, as an instance, the wire 96 of the cable 94 corresponding to the letter "B" is connected to the second terminal 97 and by the movable contact 98 is connected to the bus bar 99, and the wires for the letters "C" and "Z" are connected in the manner described with respect to the letters "A" and "Y."

*Mechanism for setting the last quotation*

The mechanism for setting the last quotation will now be described since it will operate with each new quotation differing from a previous one, whether high or low, and since such mechanism may be divorced from the mechanism for operating the "open," "high" and "low" quotations and be operated as a single quotation reporting or quotation posting mechanism.

In the present instance, there are provided four number wheels 9 for the last quotation, to wit, the wheels 90, 91, 92 and 93. These four wheels, see Fig. 3, have each a disk element 100 and a cylindrical element 101 on which the numerals or indicia are formed. In the present instance, each of the wheels 90, 91 and 92 have ten numbers, from one to nine inclusive with the zero indicia disposed between the numeral "9" and the numeral "1." The wheel 90 will indicate the hundreds, the wheel 91 will indicate the tens and the wheel 92 will indicate the units of a whole number. The wheel 93, in the case of a stock quotation however, will bear only seven numerals, "1" to "7," inclusive, indicative of the eighths of a dollar, when reporting the price or quotation, in accordance with the conventional practice on the stock markets of the United States. This wheel, however, will have not only the seven numerals, "1" to "7," on the cylindrical portion 101, but also one blank area, one white mark, spot or area, and one black mark, spot or area, the latter black spot when displayed indicating that the quotation is a whole number and does not include a fraction, the blank area never displayed at rest, and the white mark, spot or area only displayed at the opening of the trading day and to continue being displayed until the initial sale has been recorded.

In the case of the keyboards 3 and 4, in addition to keys for the letters of the alphabet, there is provided a key for an arbitrary symbol such as an asterisk or a star, an asterisk being shown on the additional key of the keyboard 3, Fig. 12, and a star being shown on the additional key of the keyboard 4 in order to complete the selector circuit which requires that all three relays 43, 55 and 62 be energized in every case, whether the stock symbol contains one, two or three letters.

In the case where the stock symbol consists only of one letter, then the asterisk and star keys would both be depressed, while in the case where the stock symbol consists of two letters, the star key would be depressed to complete the circuit for the three aforesaid wires.

Wheels 90, 91, 92 and 93 each have a cylindrical bearing 102 or hub rotating on the shaft 18. The disk 100 of the wheel 93 is secured to the disk of the gear 103 which in turn is fixed to the shaft 18. The gear 103 in the present instance is provided with a single tooth to engage the teeth of the gear 104 on the shaft 105 parallel to the shaft 18. The gear 104 has ten teeth so that it will be rotated only one-tenth of its angular cycle with every full or complete rotation of the gear 103. The gear 104 in the present instance is integral with the sleeve 106 on the shaft 105 which sleeve 106 in turn is integral with the gear 107 in mesh with the gear 108 mounted on the shaft 18 and secured to the disk 100 on the gear 92, the gears 107, 108 having a ratio of 1 to 1 with one another. In turn the gear 107 through the sleeve 106 is integral with the gear 109 which has one tooth to engage the teeth, ten in number, of the gear 110 mounted on the shaft 18 and secured to the disk 100 of the wheel 91. The bearing 102 of the wheel 91 is preferably longer than the bearing 102 of each of the wheels 92 and 93 and has secured thereon the hub of the gear 111. The gear 111 has one tooth to engage during every complete revolution one tooth of the ten teeth on the gear 112 fixed to the sleeve 113 of the gear 114 mounted on the shaft 105, the teeth of the gear 114 in turn being in mesh with the teeth of the gear 115 secured to the disk 100 of the wheel 90. From the foregoing, it will thus be seen that with every complete rotation of the wheel 93 it will cause the wheel 92 to be rotated one-tenth of its angular cycle, that with every complete rotation of the wheel 92 the latter will cause the wheel 91 to be rotated one-tenth of its angular cycle, and that with every complete rotation of the wheel 91 the latter will cause the wheel 90 to be rotated one-tenth of its angular cycle and in turn the rotation of the wheel 93 in the reverse direction will have a similar effect in the reverse direction on the wheel 92, and similarly the reverse rotation will be translated from the wheel 92 to the wheel 91 and from the wheel 91 to the wheel 90.

Each of the wheels 91 to 93, inclusive, in turn has secured thereto a slip ring supporting disk 116, such as illustrated in Fig. 5. The disk 116 is composed of some suitable insulating material having an outer raised conducting slip ring 117 and an inner raised conducting slip ring 118. Between the rings 117 and 118 there are five concentric arcuate sets of raised contacts, the first set 119 nearest the outer slip ring 117 being electrically connected to the slip ring 117 and four in number. The next set of four contacts consists of the three contacts 120, all electrically connected to the slip ring 117 and the single contact 121 electrically connected to the slip ring 118, the contacts 120 and 121 all alining with a circle having a shorter radius than the radius of the circle in which the contacts 119 are formed. The third set of arcuate contacts consists of two contacts 122 electrically connected to the outer slip ring 117 and the two contacts 123 electrically connected to the inner slip ring 118. The fourth set of contacts nearer the center of the disk 116 consists of the single contact 124 electrically connected to the outer slip ring 117 and the three contacts 125 electrically connected to the inner slip ring 118. The fifth set of contacts and nearest to the inner slip ring 118 consists of the four contacts 126, all electrically connected to the inner slip ring 118.

The outer slip ring 117 is continuously in engagement with the brush 127 and the inner slip ring 118 is continuously in engagement with the brush 128.

The electrical connections, not numbered, between the outer slip ring 117 and the intermediate arcuate contacts 119, 120, 122 and 124 and the electrical connections between the inner slip ring 118 and the intermediate arcuate contacts 121, 123, 125 and 126 above referred to are depressed, that is, recede from the face of the disk 116 so that the brushes now to be described do not engage the connections between the intermediate arcuate contacts and the outer and inner slip rings 117 and 118, respectively.

Furthermore, the intermediate arcuate contacts are only intermittently engaged as distinguished from being continuously engaged. As an instance, the contacts 119 are intermittently engaged by the outermost brush 129, the contacts 120 and 121 by the brush 130, the contacts 122 and 123 by the brush 131, the contacts 124 and 125 by the brush 132, and the contacts 126 by the brush 133, see Fig. 3.

The aforesaid intermediate contacts cooperate with the outer and inner slip rings in pairs. Consequently only five wires need be provided with each numeral key of the key board 5, to obtain ten combinations, two wires to each key, Figs. 10 and 12.

The numeral key board 5 will consist of four key board rows 134, 135, 136 and 137, the key board row 134 for the hundreds, the key board row 135 for the tens, the key board row 136 for the units, and the key board row 137 for the eighths. Since the electrical connections whereby the keys of the key board rows 134, 135 and 136 control their respective numeral wheels 90, 91 and 92, respectively, are identical only one set of connections for the hundreds key board row 135 will be described.

It is of course understood that today even on the New York Stock Exchange there are very few, if any, stocks that are selling over $200. per share and the vast majority of stocks are selling under $100. per share, so that the hundreds wheels will be rarely actuated. Furthermore, in the trading of any particular day from sale to sale the change rarely is a full dollar per share, and the vast majority of changes from sale to sale are in values of one-eighth of a dollar per share, and consequently the numeral wheel that will be actuated most of the time will be the numeral wheel 93. The hundreds wheel 90, of course, would also be actuated if the price rises from "99⅞" to "100" or above, or from "199⅞" to "200" or above, and would of course also move if the price rose from "100" to "200" or dropped a full hundred. Since in any price change where the price change would cause the hundreds wheel to change, all of the other numeral wheels would also be actuated, as an example, a price change will now be explained which will affect the hundreds wheel and thereby all of the other numeral wheels.

In Fig. 12 it is assumed that the last previous price recorded was "300" and that the new price recorded was "200." When the new "200" price was to be recorded, and assume that the stock corresponded to the symbol DAY, the operator would first operate the three letter sets of keys 2, 3 and 4 of the stock selector key board 1, whereupon the relays now to be described corresponding to the last previous quotation assumed to be "300" on the wheels 90, 91, 92 and 93 would be energized. Thereupon the numeral wheels 90, 91, 92 and 93 will only be actuated to the new price "200" after the numeral 200 and a black key on the key board rows 134 to 137 were depressed.

As an instance, looking at Fig. 12 after the stock selector key board 1 had been depressed, and assuming that the numeral wheels 90, 91, and 92 registered "300" and the numeral wheel 93 displayed a black spot indicating that there was no fraction of a dollar in the last previous quotation reported, then upon the actuation of the bell crank 79, Fig. 11, to bring the several contacts 82, 83, 84 and 85 into engagement with the several pairs of contacts 86, 87, 88 and 89 certain of the relays now to be described associated with each of the wheels 90, 91, 92 and 93 will be energized. In the present instance, some of the relays 138 associated with the numeral wheel 90 will be energized.

The contacts 86, 86 of the wheel 90 will be connected to the brushes 128 and 127. The brushes 129 to 133, inclusive, provided for cooperating with the intermediate arcuate contacts 119 to 126, inclusive, are each connected with one of the wires in the cable 139. As an instance, the wire 140 will be connected to the brush 129, the wire 141 will be connected to the brush 130, the wire 142 to the brush 131, the wire 143 to the brush 132 and the wire 144 to the brush 133. In the present instance, to facilitate illustrating the same, the relays 138 are arranged in pairs so that the first pair 145 are connected to the wires 140 and 141 respectively, and will alone be energized when the numeral "9" is displayed on the numeral wheel 90. The next pair of relays 146 are connected to the wires 140 and 142, respectively, and will be alone energized when the numeral "8" on the numeral wheel 90 is in displaying position. The pair of relays 147 will be associated when displaying the numeral "7," the relays 148 will be associated when displaying the numeral "6," the relays 149 when displaying the numeral "5," the relays 150 when displaying the numeral "4," the relays 151 when displaying the numeral "3," the relays 152 when displaying the numeral "2," the relays 153 when displaying the numeral "1," and the relays 154 when displaying the indicium "0." The pair 147 are connected to the wires 140 and 143, the relays 148 are connected to the wires 140 and 144, the relays 149 to the wires 141 and 142, the relays 150 to the wires 141 and 143, the relays 151 to the wires 141 and 144, the relays 152 to the wires 142 and 143, the relays 153 to the wires 142 and 144, and the relays 154 to the wires 143 and 144.

Each relay 138 when energized is adapted to close a switch 155. If the two switches 155 of the relays 151 are closed, then a circuit will be established to switch 394 from the negative relay low voltage lead 48 through the conductor 156 and to all of the resistances 157 associated with the relays 151, 150, 149, 148, 147 and 146 connected to the conductor 158 which is connected to the down relay 159, in turn connected by the conductor 160 to the switch 394.

The up relay 161 and its relation to the down relay 159 will now be described. The up relay is connected by the conductor 162 to the series of resistances 163, which resistances are in turn connected to the series of contacts 167. From the foregoing it will thus appear that so far through the brushes 127, 128 connected to the outer slip ring 117 and inner slip ring 118, respectively, and the brushes 130 and 133 with the arcuate contacts 120 and 126 adjacent to one another, that the relays 151 will be energized to close their respective switches 155, the current for energizing the relays 151 passing from the low voltage main lead 48 through the conductor 164, through the relays 151, and then through the wires 141 and 144 to the outer slip ring 117 and inner slip ring 118, respectively, to the brushes 127 and 128, respectively, and then through the contacts 86 and 82 to the conductor 165 and from it to the main low voltage lead 39.

Up to this time, however, neither the relays 159 nor 161 will have been energized. These can only be energized when a key corresponding to a numeral indicia "0" to "9," inclusive, on the key board row 134 is energized. In Fig. 12 the keys 166 diagrammatically shown are members of the key board row 134.

If the next quotation is "200," indicative of the fact that the price has dropped from "300," the last preceding quotation, then the key 166 corresponding to the numeral "2" will be depressed and when so depressed it will initially first engage the contact 167, then the contact 168. By initially engaging the contact 167, it will establish a circuit down through the several resistances 163 associated with the numerals "2" to "9," inclusive, and then pass through the key 166 to the conductor 169 back to the low voltage lead 48, at which time there will be less resistance connected to the down relay 159 than to the up relay 161. When the key 166 is so depressed, it will, as aforesaid, initially engage the contact 167. When it engages the contact 168, then a circuit will be established from the low voltage lead 48 down through the conductor 169 through the switch 166, contact 168, to the conductor 395 to the relay 396 to the conductors 397 and 175 to the positive main low voltage lead 39. When the circuit is so established through the relay 396 it will close the switch 394 thus completing the circuit for the two relays 159 and 161 so that the lever 170 connected to the equalizing springs 171 and 172 will be deflected toward the down relay 159, in turn to press the contact 173 into engagement with the contact 174 and thereby cause an electric current to be established from the low voltage lead 39 through the conductor 175 to the conductor 176, and from the conductor 176 to the conductor 177 by way of the relays 195, 196 and 197, and from the conductor 177 to the down relay 178 and from the down relay 178 through the conductor 179 to the switch arm 180 where the current is interrupted until the relay 181 is energized to swing the switch 180 into contact with the contact 182 when the current will then pass up through the conductor 183 and out through the low voltage main lead 48. The relay 181, however, will not be energized until at least a numeral indicia key in the key board row 137 has been depressed or until, as in the present instance, a key in each of the key board rows 134, 135, 136 and 137 has been depressed. When at least a numeral indicia key in row 137 has been depressed or all four keys have been depressed they will automatically be held in depressed position.

When the relay 178 is energized it will swing the two switch arms 184 and 185 into contact with the contacts 186 and 187. This will in the first place cause the solenoid 188 to be energized; the current passing from the main high voltage lead 78 through the conductor 189 to the switch arm 184 then the conductor 190 through the solenoid 188 to the conductor 191 and from the conductor 191 to the other high voltage lead 73. When the solenoid 188 is so energized, it will actuate its core 193 to actuate the lever 194, in turn to actuate the clutch 25 to mesh with the clutch 27 to the beveled gear 29, whereby the motor 33 will through the beveled gears 31 and 29, actuate the shaft 21, in turn to actuate the shaft 18 to cause the numeral wheels 90, 91, 92 and 93 to be actuated so that the lower price quotation "200" will be displayed in place of the preceding last quotation "300." To cause the numeral wheel 90 to be rotated in a reverse direction in view of the transmission aforesaid, it will of course be obvious that the shaft 18 will initially rotate the wheel 93 in turn to actuate the wheel 92, in turn to actuate the wheel 91 and finally to actuate the wheel 90.

When the current is so initially set up in the conductor 176 it will at the same time energize the up relay 195 of the tens mechanism, the up relay 196 of the units mechanism and the up relay 197 of the eighths mechanism so as to attract their respective switches 198, 199 and 200 to throw out all up circuit keys and thus insure the current affecting only the down relay 178.

When the solenoid 188 has so been energized to drivingly connect the shaft 18, the shaft 18 will rotate until the wheels 93, 92 and 91 have reversed successively until the wheel 90 has moved into position to display the numeral "2" instead of the numeral "3." When this happens, then the resistance 157 associated with the relays 152 will be electrically connected due to the fact that the relays 152 will have been energized to close their respective switches 155. The relays 152 will, of course, be energized the moment that the hundreds wheel 90 has moved into position where the brushes 130 and 131 will register with the contacts 125 and 122. When the resistance 157 associated with the relays 152 is so energized, the down relay 159 and the up relay 161 will both be electrically balanced, that is, both have the same flow of current passing through them to allow the springs 171 and 172 to move the arm 170 into neutral position and thereby permit the switch 173 to withdraw from contact with the contact 174 and thus interrupt the current to the relay 178 to allow the switch arms 184 and 185 to separate from their respective contacts 186 and 187.

This interruption in the current will, of course, interrupt the flow of current through the relay 181 to allow the switch arm 180 to be returned by its spring and when it does return, it will momentarily swing the switch arm 201 into contact with the contact 202 by means of trigger arm 204 with its shoulder 203. Arm 204 releases switch arm 201 by being cammed upwardly at the end of its stroke, thus interrupting the current thereby momentarily established. The circuit established by the engagement of the switch arm 201 with the contact 202 will cause the current to flow from the low voltage lead 48 through the conductor 47 to the conductor 205 and then through the solenoid 206 to attract its core 207. From the solenoid 206 the current passes through the conductor 208 to the conductor 209 to the contact 202 and from the contact 202 to the arm 201 and from the arm 201 to the conductor 210, and from the conductor 210 to the conductor 38, and then up to the other low voltage lead 39. When the solenoid 206, Fig. 10, is thus momentarily energized by attracting its core 207, it will actuate the bracket 211 to clear the latches 212, 213, 214 and 215 to allow the keys of any of the several key board rows 134, 135, 136 and 137 previously depressed to rise to their former normal position.

At the same time that the solenoid 206 is energized with the momentary engagement of the contact 202 by the arm 201, the relay 216 will be energized to actuate the arm 46 to clear its contact 217 thereby to interrupt the current passing through the wire 45 to de-energize the relays 43, 55 and 62 and thereby allow the holding switches 49, 56 and 63 of the stock selector key board to be released.

If the new quotation was higher than the last previous quotation displayed by the wheel 90, the up relay 161 would be effective to attract the arm 170, thereby initially to energize the down relays 218, 219 and 220 to throw out all down circuit keys and finally energize the up relay 221 instead of the down relay 178, and finally energize the solenoid 222 to drivingly connect the shaft 21 with the motor 33 in turn to drivingly connect the shaft 18 to rotate in the opposite direction to that heretofore described, that is, to cause the several wheels 93, 92, 91 and 90 successively to be rotated until a higher numeral appears on the numeral wheel 90 than that theretofore displayed. After the new quotation is displayed by the wheel 90, then the mechanism will come to rest in the same way as heretofore described when the new quotation was lower, and the relays 216 and solenoid 206 will be energized, the one to release the circuit closing keys for the stock selected, and the solenoid 206 mechanically to release the numeral keys of the key board rows 134 to 137, inclusive. The solenoids 188 and 222 thus serve as solenoid control means to cooperate with the movable contacts 82, 83, 84 and 85 when said key board 5 has been actuated.

*Mechanism for setting either the high or low quotation*

When describing the operation of the mechanism for setting the last quotation, it was shown how the numeral wheel 90 previously displaying a "3," or rather when the numeral wheels 90, 91, 92 and 93 previously displaying the price "300" with a black spot on the numeral wheel 93, was changed to display "200" with a black spot indicative of a $200. quotation. In other words, it described how the last quotation wheels 90 to 93 and its associated mechanism was operated to cause the price to change from a higher to a lower price.

When, however, the new quotation on the last quotation wheels 90 to 93, inclusive, drops to a new low for the trading day, then the adjacent set of numeral wheels 223, 224 and 225 may be actuated to display the new low. If the new quotation being recorded by the last quotation wheels 90 to 93 is lower than the previous last quotation, but not lower than the lowest quotation of the day, then the low quotation wheels 223, 224 and 225 will remain unaffected.

In turn, if the new quotation being reported by the last quotation wheels 90 to 93 is the high for the particular trading day, and higher than any quotation previously recorded by the high quotation wheels 226, 227 and 228, instead of actuating the low quotation wheels 223, 224, and 225, the high quotation wheels 226, 227 and 228 will be actuated to report or display the new high quotation for the day. In turn, if the new quotation reported by the last quotation wheels 90 to 93 is higher than the previous last quotation, but not higher than the highest quotation for the day reported or displayed on the high quotation wheels 226, 227 and 228, then the high quotation wheels 226, 227 and 228 will remain unaffected.

It is here assumed that the low quotation wheels 223, 224 and 225 and the high quotation wheels 226, 227 and 228 will be operated relative to a particular trading period, such as a particular trading day as aforesaid, a particular trading week or the like. In other words, when the start of a particular trading day has been determined, it will only be necessary to set the last quotation wheels 90 to 93, inclusive, the low quotation wheels 223, 224 and 225, and the high quotation wheels 226, 227 and 228 to coincide with one another in the manner hereinafter described, when the low quotation wheels 223, 224 and 225 and the high quotation wheels 226, 227 and 228 will be ready for operation as now to be described.

In the interest of simplicity, neither the low quotation wheels nor the high quotation wheels just referred to will have a hundreds wheel, but only have a tens wheel, units wheel and eighths wheel. The low quotation wheel 223 and the high quotation wheel 226 reporting or displaying the tens, the low quotation wheel 224 and the high quotation wheel 227 displaying the units, and the low quotation wheel 225 and the high quotation wheel 228 displaying the eighths.

The mechanism for automatically causing the low quotation wheels and the high quotation wheels to be actuated according to the present invention are substantially identical, one acting just the reverse of the other. For the purpose of the present description, the mechanism for actuating the low quotation wheels 223, 224 and 225 will first be described. It will appear from the previous description that when the last quotation wheels 90 to 93 have been actuated to move to a lower price, that the down relay 178 was actuated and also the solenoid 188. When the down relay 178 was actuated, the actuation of the switch arm 185 into engagement with the contact 187 closed the circuit to energize the down relay 229, the current passing from the low voltage main lead 39 through the conductor 230 through the switch arm 185, contact 187 to the conductor 231 and from the conductor 231 through the conductor 232 to the down relay 229 and then through the conductor 233 to the switch arm 234 and from the switch arm 234 to the contact 235 to the conductor 236 and from the conductor 236 to the low quotation wheels 225, 224 and 223 and then out through the conductor 237 to the conductor 238 and from it back to the other main low voltage lead 48.

As described, when selecting the stock through the key board 1, the solenoid 10 will be energized to actuate the lever 11 and when actuating the lower 11 it will at the same time through the projection 239 actuate the switch arm 240 connected to the switch arm 234 so that the switch arms 240 and 234 will engage the contacts 241 and 235, respectively.

The conductor 236, Fig. 11, is connected to the brush 241, Fig. 3. The conductor 237, Fig. 11, on the other hand, see Fig. 3, is connected to the brush 242. The connection is such that when the shaft 18, rotating so that it will cause the last quotation wheels 90 to 93, inclusive, to change from a quotation above that displayed on the low quotation wheels 223, 224 and 225 to one lower than that displayed on the low quotation wheels 223, 224 and 225, the shaft 18 will in the meantime cause the hubs of the low quotation wheels 223, 224 and 225 to aline where they will cooperate with the numeral wheels to establish a circuit between the brushes 241 and 242. When the hubs will so correspond to the position of the numeral wheels of the quotation being displayed, then, due to the fact that the solenoid 229 will be energized to contact the double switch 398 and 399 causing the arm 399 to engage the contact on the conductor 403, the solenoid 243 will be energized to actuate the lever 244 in turn to rotate the shaft 245 and withdraw the projection 246 out of locking engagement with the numeral wheel 225, when a locking means such as the spring pressed ball 247 of the numeral wheel 228, which rests in a detent 323 to connect the low quotation wheel 225 with the hub, such as the hub 248, Fig. 9, of the numeral wheel 228. Thereupon with the continued rotation of the shaft 18 which is pinned to the sleeve 249 of the hub 248, the eighths wheel 225 will be rotated, and it, through the connection now to be described, may finally also rotate the numeral wheels 224 and 223 if the low for the day requires also changing these two wheels 224 and 223, provided that the numeral wheel 225 is free to be rotated. If, however, it is anchored against rotation, the spring of the ball 247 will allow the ball 247 to be pressed out of the way while the hub 248 is being rotated.

As shown in Figs. 3 and 4, the sleeve 249 of the hubs 248 of both the wheels 225 and 228 are pinned to the shaft 18 as aforesaid. Consequently, the moment that the shaft 18 is rotated, it will not only rotate the sleeve of the gear 102 of the last quotation wheels, but also the hubs 248 of the wheels 225 and 228 of the low and high quotation set. The hub 248 of the low quotation wheel 225 has a single tooth 250 in mesh with the gear 251 on the shaft 252 parallel to the shaft 18. The gear 251 has ten teeth and is integral with the hub 253 which has on it the gear 254 having a plurality of successive teeth and also the gear 255 having on it a single tooth 256. The teeth of the gear 254 in turn mesh with the teeth 257 of the hub 258 integral to its sleeve 259 rotatably mounted on the shaft 18. The teeth of the gears 254 and the teeth 257 of the hub 258 have a ratio of 1 to 1. The single tooth 256 of the gear 255 meshes with the teeth 260 on the hub 261 which is integral with its sleeve 262 rotatably mounted on the shaft 18. The teeth 260 are ten in number. In view of the foregoing, with every single complete rotation of the hub 248, it will impart one-tenth of a rotation to the gear 251 and the gear 251 through the gear 254 will impart one-tenth of a rotation to the hub 258. In turn, since the gear 255 is integral with the gears 251 and 254, every complete rotation of the gear 255 will impart only one-tenth of a rotation to the hub 261, and consequently the hub 261 will receive one-tenth of a rotation with every complete rotation of the hub 258. On the hub 248 is rotatably mounted the eighths numeral wheel 225, on the hub 258 is rotatably mounted the units numeral wheel 224, and on the hub 261 is rotatably mounted the tens numeral wheel 223.

The eighths numeral wheel has a single tooth 263 in mesh with the notches 264, ten in number, of the wheel gear 265. The wheel gear 265 has ten notches or teeth to one notch 263 of the wheel 228 and is integral with the sleeve 266 which in turn is integral with the gears 267 and 268. The gear 267 has a plurality of notches or teeth in mesh with the teeth 269 of the units wheel 224, 227 and the gear 268 has a single notch or tooth in mesh with the plurality of teeth 270 on the tens wheel 223, 226 from which it will appear that when the eighths wheel makes a complete rotation it will rotate the gear 265 only one-tenth of a rotation, and through the gear 267 will rotate the wheel 224, 228 one-tenth of a rotation for every complete rotation of the wheel 225; and since it requires a complete rotation of the gear 268 to actuate the tens wheel 223 one-tenth of a rotation, the numeral wheel 223 will only be rotated one-tenth of a rotation with every complete rotation of the units wheel 224. In other words, the hubs 248, 258 and 261 through their gears 251, 254 and 255 will be progressively reduced to one-tenth of a rotation from one to the other just as the numeral wheels 225, 224 and 223 through their gears 265, 267 and 268 will be progressively reduced to one-tenth of a rotation from one to the other.

According to this invention, the numeral wheels 225, 224 and 223 may remain stationary when the shaft 18 is initially rotated, although their respective hubs 248, 258 and 261 may be rotated with the shaft 18. For anchoring the wheels 225, 224 and 223 normally against actuation with the shaft 18, see Fig. 3, the projection 246 aforesaid will be projecting into one of the recesses 271. This projection 246 is formed on the end of the lever 272 which in turn is fixed to the shaft 245. This shaft 245 as aforesaid, however, will not rotate to withdraw the projection 246 until the solenoid 243 has been energized.

The solenoid 243 will be energized when an electric circuit has been established by a predetermined alinement of contacts now to be described and which are formed between the hubs 248, 258 and 261 on the one hand and the wheels 228, 227 and 226, respectively, on the other hand; see Fig. 9. The hub 248 has a two faced slip ring 273 having a radially extending face 274 in continuous engagement with the brush 241. The cylindrical face 275 of the slip ring 273, on the other hand, will be in continuous engagement with the contact 276 of the bracket 277, having a second contact 278 constituting a brush for engagement with the spot 279 on the cylindrical face of the hub 248, which spot 279 is electrically connected to the cylindrical slip ring 280 which is in continuous engagement with the brush or contact 281 of the bracket 282, which bracket 282 has a second contact or brush 283 to engage the contact 284 on the cylindrical face of the hub 258, Fig. 11. The spot 284 is electrically connected to the continuous cylindrical slip ring 285 in continuous engagement with the contact 287 of the bracket 288. The bracket 288 has a second contact 289 to engage the contact 290 on the cylindrical face of the hub 261. The contact 290 in turn is electrically connected to the radially extending slip ring 291 on the outer face of the hub 261 which is in continuous engagement with the brush 242.

The brackets 277, 282 and 288 are mounted and secured in the hubs of the numeral wheels 225, 224 and 223, respectively. Consequently, electrical connection from the brush 241 to the brush 242 cannot be established until the numeral wheels 225, 224 and 223 have alined their respective brackets 277, 282 and 288 so that the spots 279, 284 and 290 of the hubs 248, 258 and 261 are in engagement with their respective brushes 278, 283 and 289, respectively. This alinement obviously can be arbitrarily established. If it should be established initially when the numeral wheels display the numerals "0," "0" and a black spot on the numeral wheels 223, 224 and 225, respectively, then if the quotations to be displayed gradually decrease and the numeral wheel 225 is free to rotate with the hub 248, these brackets 277, 282 and 288 may continue to establish a circuit right through to the next to the lowest quotation that may be displayed by these three wheels, to wit: "0," "0" and "1," indicating a price of one-eighth of a dollar, the lowest quotation. While there is no purpose to it, the numeral wheel 225 can be reduced one-eighth further to return to its initial spot, "0," "0" and a black spot, indicating that the stock had no value.

The electric connections now to be described will indicate means whereby, initially the through connection from the brush 241 to the brush 242 will only take place when the new quotation being reported will pass from a higher quotation to one lower than that registered on the low quotation wheels 223, 224 and 225. This again will take place at the moment that the hubs 261, 258 and 248 in the course of their rotation with the shaft 18 will move to bring their spot contacts 290, 284 and 279 into engagement with the brushes 289, 283 and 278. If all of the quotations before the last were higher than that recorded by the lowest quotations 223, 224 and 225, obviously the hubs 261, 258 and 248 would not have theretofore brought these spot contacts into contacting position.

When the hubs 261, 258 and 248 have brought their contacts into contacting position with the wheels 223, 224 and 225 in the process of reporting a new low, then the electrical circuit will be established by the wiring heretofore described. Starting as an instance from the low voltage lead 48 the current will pass through the conductor 238 to the brush 242 and then after passing through the connection established by the brackets 288, 282 and 277, the current will pass to the brush 241 and out through the conductor 236 to the contact 235, the switch arm 234, the conductor 233, the down relay 229, conductor 232, the contact 187, to the switch arm 185 and the conductor 230, back to the other low voltage main lead 39. Thereupon the wheels 223, 224 and 225 will rotate with the hubs 261, 258 and 248 until the new low is posted when the down relay 159 and up relay 161 will balance one another to free the arm 170 and break the circuit, in turn to de-energize the relay 178 and permit the switch arms 184 and 185 to clear the contacts 186 and 187. When the switch arms 184 and 185 so clear the contacts 186 and 187, respectively, not only will the circuit through the numeral wheels 223, 224 and 225 be interrupted, but also the circuit to the solenoid 188, thereby to enable the core 193 again to free the clutch element 25 from the clutch sleeve 27 of the beveled gear 29. At the same time the relay 181 will be energized to enable the switch arm 180 to clear the contact 182 and then under the bias of the spring 292 enable the lever 204 with its shoulder 203 momentarily to cause the arm 201 to engage the contact 202. In this momentary contact as aforesaid, the relays 216 and 206 will be energized to break the contact between the arm 46 and the contact 217 to de-energize the holding relays 43, 55 and 62 and in turn to actuate the solenoid 206 to release the keys 134 to 137, inclusive.

If the last new quotation was higher than the last previous quotation and constituted the high for the trading day, then in the first place, the solenoid 222 will be energized by the wiring now to be described to cause the shaft 18 to be rotated in the reverse direction, not only to set the last quotation wheels 90, 91, 92 and 93 to the new high quotation, but also to actuate the high quotation wheels 226, 227 and 228 to post or report the new high quotation for the day. Since the mechanism of the high quotation wheels 226, 227 and 228 and their respective wiring is identical with that of the low quotation wheels 223, 224 and 225, the description will not be repeated, but the reference characters merely applied to like parts. In operation, the circuits will be traced to facilitate an understanding of the operation of the high quotation wheel. The three sets of alphabetical keys 2, 3, 4 of the key board I for selecting the stock will, of course, have to be initially depressed and thereupon the required rows of keys 134 to 137, inclusive, or at least row 137 with row 136 alone or rows 136 and 135, or with rows 136, 135 and 134. The circuits established by the stock selector keys 2, 3 and 4 need not be repeated since they are identical to the circuits established when posting a new low as heretofore desired, except to indicate that the solenoids 10 and 35 will be energized to actuate the clutch member 24 into engagement with the clutch teeth of the sleeve 22 and also to actuate the clutch member 12 into engagement with the clutch teeth 13 of the sleeve 14. The circuit for energizing the solenoid 222 drivingly to connect the shaft 18 in the reverse direction will now be described. Looking at Fig. 12, assume now that relays 151 are energized due to the fact that the previous quotation corresponds to the price "300," but that instead of depressing the key 166 of the set 134 corresponding to the numeral "2," the key 166 corresponding to the numeral "4" will be depressed. Thereupon, the current flow through the relay 161 will be greater than that flowing through the relay 159 and therefore attract the arm 170 to actuate the switch arm 293 into engagement with the contact 294 whereupon the current starting from the low voltage lead 39 will pass down through the conductor 175 to the switch arm 293, contact 294 to the conductor 295, then up through the several down relays 218, 219 and 220 to energize the same and interrupt the current between the switch arm 296 and contact 297, the switch arm 298 and contact 299, the switch arm 300 and contact 301 to throw out of circuit all of the down circuit relays. From the relay 218 the circuit will then pass through the conductor 302 to conductor 303, to relay 221 and then back through conductor 179 to the switch arm 180, contact 182 and return low voltage lead 48. The switch arm 180 will in this action have been brought into contact with the contact 182 when the relay 181 has been energized as a result of the four keys in the key board 5 having been depressed, that is, one key in each of key rows 134 to 137, inclusive, as heretofore explained.

When the relay 221 is thus energized, it will bring the switch arms 304 and 305 into contact with the contacts 306 and 307 thereby to complete the circuit to the solenoid 222 and also to the relay 308. In the latter case, when the solenoid 222 is energized, it will then actuate the clutch 26 into engagement with the clutch sleeve 28 of the beveled gear 30 thereby to drivingly connect the shaft 21, and in turn the shaft 18 with the motor 33. The electric circuit for the solenoid 222 can be traced from the high voltage lead 73 to the conductor 309, to the solenoid 222, then the conductor 310 to the switch arm 305, and then to the conductor 189 to the return high voltage lead 78. The circuit for the relay 308 can be traced as follows: the main low voltage lead 39 being connected to the conductor 230 which in turn is connected by the arm 304 with the contact 306 to the conductor 311 to the switch arm 312 from the switch arm 312 to the conductor 313 to the relay 308 and from the relay 308 by means of the conductor 314 to the switch arm 240, contact 241, conductor 315 to the brush 316 and then through the numbering wheels 228, 227 and 226 to the brush 317 to the conductor 318 to the conductor 238 and back to the return low voltage lead 48. With the high quotation wheels 226, 227 and 228, however, since they will only establish a circuit when the shaft 18 is turning in the reverse direction, that is, to actuate the wheels to post a higher quotation, when the circuit is established from the brush 316 to the brush 317 by the hubs 248, 258 and 261 in the wheels 228, 227 and 226, the initial release of the wheel 228 from the projection similar to the projection 246 on the arm 319 will only take place when the solenoid 320 has been energized. This solenoid will be energized when its circuit is established by the earlier energization of the relay 308. When the solenoid 320 is energized it will actuate the lever 321 in turn to rotate the shaft 322 to rock the arm 319 and thereby withdraw its projection to enable the balls 247 in the recesses 323 to rotate the wheel 228 with the hub 248. When the solenoid 320 is energized, the current will flow from the high voltage main lead 73 through the switch arm 324 to the contact 325 and from the contact 325 through the conductor 326 to the solenoid 320 and from the solenoid 320 the current will flow by means of the conductor 327 back to the return high voltage lead 78.

It is, of course, obvious from the foregoing when posting a quotation from 99½ to 111⅛, as an instance, that when the arm 170 breaks the contact by reason of the new number becoming the same as the old number and thereby equalizing the resistances, the arm in the tens column similar to the arm 170 will then make a similar contact on the similar side by reason of the fact that the degree of resistance in the opposing resistances is in the same relation as it was in the hundreds column. When the tens digits are equal, the corresponding arm 170 in the units column will function in the same manner for the same reason; and when the resistances become equal in the units column the arm in the eighths column will similarly function.

When a new low figure is to be posted, the four arms similar to arm 170 and corresponding resistances would function in the opposite direction.

*Mechanism for setting board at the opening*

Obviously this quotation board can be a continuous system running from week to week or for a whole month with the last quotation wheels 90 to 93, inclusive, posting the last new quotation and in the course of the trading period, whether one day, a week or a month, and the low quotation wheels 223 to 225 during such trading period only post or register the low quotation during such trading period, and in turn the high quotation wheels 226, 227 and 228 registering or posting the high quotation during such trading period.

In some instances it may be desirable to have an additional quotation known as the "open" quotation to indicate th first quotation of any given trading period. In the average New York city broker's office it probably would be the open quotation for each trading day. In order to obtain this "open" quotation, the quotation wheels 328, 329 and 330 will be actuated. These three wheels, see Fig. 3, are all mounted on a common hub 331 having a sleeve 332 pinned to the shaft 18, in the present instance by the pin 333. The numeral wheel 330 will display the indicia "1" to "7" inclusive, a blank space, a white spot and a black spot corresponding to the keys 334 of the row of numeral keys 137. The numeral wheel 329 will display the units numerals and the wheel 328 will display the tens numerals. In the present instance, the hub 331 will have ten recesses 335 to receive the ball 336 biased by the springs 337. The wheels 328, 329 and 330 are connected to one another so that as the eighths wheel 330 completes a full rotation, it will actuate the wheel 329 one-tenth of a rotation, and in turn when the wheel 329 completes a rotation, it will actuate the wheel 328 one-tenth of a rotation. This translation of movement is brought about by the mechanism now to be described. The numeral wheel 330 has a single tooth 338 which is adapted to engage the notches or teeth 339 in the gear 340. There are ten notches or teeth 339 so that the gear 340 will only be rotated one-tenth of a rotation with every rotation of the numeral wheel 330. The gear 340 is integral with the gears 341 and 342 through the hub 343. The gear 341 has a plurality of teeth or notches 344 in mesh with the teeth 345 of the numeral wheel 329 having a ratio of 1 to 1 with one another, and the gear 342 has a single notch 346 to mesh with the ten teeth 347 of the numeral wheel 328.

In view of this connection, whenever the projection on the arm 348 similar to the projection 246 is withdrawn from the recesses in the side of the wheel 330, the hub 335 will carry with it the wheel 330, either to move to a higher quotation when rotating in one direction or to a lower direction when moving in the reverse direction. The lever 348 is fixed on the shaft 349 which is connected by the lever 350 with the core 351 of the solenoid 352. Consequently, whenever the solenoid 352 is energized to actuate the lever 348, the hub 335 will rotate with the shaft 18 in either direction in turn to actuate the numeral wheels 330, 329 and 328.

In order to have the numeral wheels 328, 329 and 330 correspond to the numeral wheels of the high, low and last quotations at any one time, and necessarily before the first quotation, or opening quotation, is posted, it will be necessary to set the wheels of the last quotation of the low quotation and of the high quotation all to the same quotation which previously appeared on the numeral wheels 328, 329 and 330 of the open quotation wheels.

For this purpose, before the opening of a trading period, assuming the open quotation on the numeral wheels 328, 329 and 330 were lower than the high quotation of the preceding day and lower than the last quotation of the preceding day or trade period, then excellent results are achieved when the last quotation wheels 99 to 93 are first in the regular way raised to equal the high quotation on the high quotation wheels 226, 227 and 228. Assuming that the last quotation on the last quotation wheels 90 to 93, inclusive, were "028-," and the high quotation was "0281" indicating that the high quotation was one-eighth of a dollar higher than the last quotation, then it is only necessary to depress the symbol on the key board 1 to select the stock desired and to depress the numerals "0281," whereupon the last quotation wheels 90 to 93, inclusive, will move up to correspond with the quotation on the high quotation wheels 226 to 228, inclusive. Then it is desired that the high quotation wheels and the last quotation wheels be reduced to the open quotation of the last previous day, which it is assumed for the purpose of the present example to be "0277" when the reversing switch consisting of the arms 353 and 312 is swung out of contact with the contacts 354 and 355 and into engagement with the contacts 356 and 357. Then if the same stock is again selected and the numeral keys corresponding to the quotation "0277" are depressed, then the last quotation as well as the high quotation wheels will turn back to register or post the numerals "277" on the high quotation wheels and the numerals "0277" on the last quotation wheels.

Thereupon if the reversing switch is again returned to normal where the switch arms 353 and 312 engage the contacts 354 and 355, and the same stock is again selected and the keys corresponding to the quotation "0276" which is assumed as the low quotation for the preceding day are now depressed. the last quotation wheels 90 to 93, inclusive, will recede to post the quotation "0276." Thereupon it is only necessary again to actuate the reversing switch and swing the arms 353 and 312 back to the contacts 356 and 357 and after depressing the stock selecting keys and the numeral keys corresponding to the quotation "0277," the last quotation wheels and the low quotation wheels will move up so that the last quotation wheels will post the quotation "0277" and the low quotation wheels will post the quotation "277" when all of the quotation wheels, open, high. low and last, all have the same quotation. It might then be desirable that all of the quotation wheels be changed to a fractionless number, such as the number "028–" for the last quotation wheel when each of the other quotation wheels will register the quotation "28–" in which case the "–" will indicate a white spot to indicate that there has been no transaction in the stock, the white spot appearing in the zero area of the eighths numeral wheels.

In order to cause all four sets of quotation wheels to rise from "0277" to "028–" it will first be necessary to change the reversing switch back to normal where its arms 353 and 312 engage the contacts 354 and 355, and the opening key 358 on the key board 1 is depressed together with the keys corresponding to the stock selected and the numeral keys on the key board 5 depressed corresponding to the quotation "028–." Since the last quotation is rising from "0277" to "028–," the motor 33 will be drivingly connected with the clutch 25 to actuate the shaft 18 to actuate the last quotation wheels 90 to 93, inclusive, in an up direction. At the same time, since this quotation is higher than "0277," the high quotation wheels 226, 227 and 228 will, of course, be actuated to the new higher quotation "028–."

When the single switch 324 and double switch arms 398 and 399 have been closed by the relays 308 and 229, then the current can pass from the high voltage negative lead 73 through the switch 324 to the conductor 400 to the switch arm 398, conductor 401 to the solenoid 352 and from the solenoid 352 through the conductor 327 back to the positive high voltage lead 78 in turn, at this time a circuit will also be established from the high voltage negative lead 73 through the conductor 402 to the switch 399, conductor 403 and solenoid 243 to the conductor 327 and finally to the positive high voltage lead 78.

In practice, highs of all stocks in which there have been transactions will be successively reduced to the respective open quotations. The reverse switch 353 will then be thrown and the lows of all stocks in which there have been transactions will be successively raised to the open quotations. Then the reverse switch will again be thrown and contact made through the open key so that all quotations may be posted at the nearest whole number to the closing quotation of the preceding day with the white spot displayed in the eighths column.

The depression of the opening key 358 when depressing the stock selector keys 2, 3 and 4 and the numeral keys 134 to 137, inclusive, will cause the relays 308 and 229 to be energized thereby in turn to energize the solenoids 352, 320 and 243 so that not only the arm 319 but also the arms 272 and 348 will be rocked to free the numeral wheels 225 and 330 to enable the shaft 18 drivingly to connect the numeral wheels 328, 329 and 330 of the opening quotation wheels, but also the numeral wheels 223, 224 and 225 of the low quotation wheels. When the opening key 358 is so depressed. the circuit for energizing the relays 308 and 329 passes from the negative low voltage main lead 48 up through the conductor 238 through the low quotation wheels to the conductor 236 and thereupon by way of the switch arm 234 to the conductor 233 and then through the down relay 229 to the conductors 232 and 231 to the switch arm 185 and from it through the conductor 230 to the positive low voltage lead 39. The latter circuit will be established if the shaft 18 is drivingly connected by means of the down relay 178 to rotate in a down or diminishing price direction. In order to establish the circuit for the up relay 308, the current for the circuit so established will pass from the negative low voltage lead 38 up through the conductors 238 and 318 to the high quotation wheels and then by way of the conductors 315, 314 to the up relay 308, then down 368 to the open button 358 and then by way of the conductor 369 to the conductor 232 and from it to the conductor 231, switch arm 185 and the down direction control to the conductor 230, and finally to the positive low voltage lead 39. If the keys depressed would initially direct that the shaft 18 were drivingly connected to rotate in an increasing price direction, then the current would normally pass through the up releasing relay 308 by way of the switch arm 304 and the circuit through the down releasing relay 229 would be established by way of the conductors 368 and 369 controlled by the button 358 as aforesaid.

After all of the sets of quotation wheels will post the same quotation, the open high and low sets of quotation wheels each posting the quotation "28–" and the last quotation wheels 90 to 93, inclusive, posting the quotation "028–," then the button 359 on the display board 360 may be depressed.

The panel 361 of each stock on the board 360 is provided with a button 359. After the four sets of quotation wheels of each stock have been set to post the nearest fractionless price to the previous last quotation at the end of the last trading day or period, then the button 359 of each panel 361 is depressed. When the button 359 is so depressed, it will bring its lever 362 into contact with the two contacts 363 and 364. The lever 362 will furthermore be held in this closed position by the arm 365 whereupon, as hereinafter to be described, when the solenoid 10 is energized it will initially depress the extension 367 of the lever 11 to bring the tripping arm 366 in position to engage the arm 365 to release the lever 362 after the solenoid 10 is again de-energized.

In other words, when the buttons 359 are depressed, then when the first quotation of a given trading day is posted, the operator will initially again select the stock to be posted through the key board 1 and then select the price by depressing the keys of the key board 5. When this is completed, assuming that the price is decreased over the fractionless posted price "028–," initially the solenoid 10 will be energized to bring the tripping arm 366 under the arm 365, but not at this time affect the position of the arm 365, that is, not disturb the position of the arm 362 to interrupt the current through the switch arm 362 across the contacts 363 and 364. While the solenoid 10 is so energized and the arm 362 is held in engagement with the contacts 363 and 364, both the releasing relays 308 and 229 will be energized so that not only the solenoid 243 will be energized, but also the solenoids 352 and 320. When the solenoids 352 and 320 are so energized, the current will pass from the negative low voltage main lead 48 through the conductor 238 to the conductor 318, the high quotation wheels by way of the conductors 315, 314 to the up releasing relay 308 and then the conductors 313, 370 to the contact 363 and then by way of the switch arm 362 to the contact 364 and the conductor 371 to the conductors 232 and 231 to the switch arm 185, and by means of the conductor 230 to the positive low voltage main lead 39.

Preferably in accordance with common practice, the current for the power circuit controlling the motor and solenoids is a high voltage circuit of 110 volts, while the current for the relays is a low voltage circuit of 24 volts.

It is, of course, also to be understood that the shafts 349, 322 and 245 will extend the full height of fifteen rows of stock posting mechanism and that the solenoids 352, 320 and 243 will be common each column of fifteen rows of stock posting mechanisms. If as heretofore set forth a stock quotation board is made according to the present invention, to post three hundred stocks, there may be provided twenty columns of fifteen rows of stock quotation posting mechanisms and a set of solenoids 352, 320 and 243 for each column.

There will also be provided one vertical shaft 16, 34, for each column of stock quotation posting mechanisms.

Each cable 139 consisting of the conductors 140 to 144, inclusive, is separated into its respective wires at the lower end of a bar 372. This bar 372, see Fig. 6, is composed of some suitable insulating material and has mounted thereon the conductive strips 373. The conductive strips 373, five in number, are each connected to one of the wires 140 to 144, inclusive, and constitute extensions of said wires 140 to 144, inclusive. Adjacent each wheel 90 of all fifteen rows of a stock quotation mechanism the bar 372 is provided with five openings to receive the brushes 129 to 133 inclusive, see Fig. 3. These brushes, see Fig. 6, engage the tongues 374 formed in the strips 373, resiliently to maintain the brushes 129 to 133 in engagement with the side of the wheel 90.

In order to anchor the shaft 18 when at rest so that it will enable the several numeral wheels accurately to display their numbers, and also to enable the several hubs when in contact forming position with their numeral wheels to register any predetermined positions, any suitable anchoring means may be used. In the present instance, the shaft 18 has mounted thereon the star wheel 375 to register with the projection 376 on the lever 377 fulcrumed at 378, and having its free arm provided with a spring 379 resiliently to maintain the projection 376 in any one of the ten recesses or depressions 380 formed in the star wheel 375.

In order to mark the several panels 360 with the stock of the quotations it will register, any suitable marking mechanism may be provided. In the present instance, each panel 360 is provided with five recesses 381 and in alinement with the same in an adjacent panel above it five similar recesses 382, which are in the present instance formed not only over the three windows 383 registering with the numerals to be displayed by the "open" quotation wheels 328 to 330, inclusive, but also above the three windows 384 registering with the numerals to be displayed by the "high" quotation wheels 226 to 228, inclusive, and the windows 385 registering with the numerals to be displayed by the "low" quotation wheels 223 to 225 inclusive. Above the windows 386 registered with the numerals to be displayed by the "last" quotation wheels 90 to 93, inclusive, in the present instance there are provided only four recesses 387 one above each window 386, and another row of recesses 388 in the adjacent panel above the panel 361, one recess 388 registering with each recess 387.

Preferably in the panel 389 at the top of the board 390 above the uppermost panel 360, the following indicia are formed: above the row of windows 383 the words "Stock" and "Open," the word "Stock" being disposed above the word "Open"; above the row of windows 384 the abbreviation "Div." and the word "High," the abbreviation "Div." above the word "High"; above the row of windows 385 the symbol "X-Date" and the word "Low," the symbol "X-Date" being disposed above the word "Low"; and above the row of windows 386 the words "Close" and "Last," the word "Close" being disposed above the word "Last." The words "Open," "High," "Low" and "Last" in the panel 389 of course indicate the character of quotations to be displayed below the same.

The word "Stock" above the word "Open" would indicate that in the openings 381 and 382 will be secured clips, such as the clips 391, bearing initials corresponding to the symbol of the stock whose quotations are being displayed on the panel 360 immediately below it. In Fig. 1, three clips 391 bearing the letters "D," "A" and "Y" are positioned in the recesses 381 and 382, the letters "DAY" in the present instance constituting the symbol for the stock Dayton Rubber Manufacturing Company. These clips 391, see Fig. 8, are generally arcuate in form and have tongues 392, 393 expressed from the same, the tongue 392 to fit into one of the recesses 382, and the tongue 393 to fit into one of the recesses 381 immediately below the recess 382 engaged by the tongue 392.

In the set of recesses 381 and 382 below the word "High" in the panel 389, clips 391 are positioned bearing the amount of the dividend, the abbreviation "Div." above the word "High," indicating that the last paid dividend will be listed or posted in this space.

Below the word "Low" in the present instance, the clips bearing numbers representing the record date of the last dividend, in the present instance the numerals "12 15" indicating that the record date of the last dividend was on December 15.

Below the word "Last" in the panel 389, the clips 391 formed in the recesses 388 and 387 will bear the numerals corresponding to the closing price of the stock whose last quotation is displayed immediately below the clips 391, the word "Close" above the word "Last" indicating to the trader that the numerals on the clips 391 secured in the recesses 388 and 387 post or register the previous closing price.

In operation, after the several quotation wheels for the open, high, low and last have been set to the nearest fractionless quotation to the last quotation of the previous trading day or trading period, then as aforesaid, key 334 of the eighths row of keys 137 for displaying the white spot on the numeral wheel 93 of the last quotation wheels will be pressed instead of the key for displaying the black spot. The key for displaying the white spot may be depressed in place of a fraction or black spot when depressing the keys for displaying the number or price with the number corresponding with the fractionless quotation nearest to the last quotation of the previous day or trading period. When this fractionless first quotation is so displayed in a particular stock panel 260, with the white spot showing on the wheel 93 of the last quotation wheels, it will indicate to the trader that no sale has been made or at least posted for the new trading day. When the first sale is posted, then for the remainder of the trading day the key for displaying the white spot will not be depressed. Whenever the quotation is a whole number, that is a fractionless number, the key for displaying the black spot will be depressed, indicating that the quotation so posted is a real quotation for the day, the quotation with the white spot ordinarily being a fictitious quotation, that is, fractionless, and nearest to the last quotation of the previous trading day or period.

The reversing switch consisting of the switch arms 353 and 312 is also useful when effecting corrections on the high and low quotation wheels.

It is obvious that various changes and modifications may be made in the details of construction without departing from the general spirit of the invention as set forth in the appended claims.

In order to effect corrections in one and/or both key boards 1 and 5 before a posting operation has been completed, the correction key 404 is provided. The circuit established by the key 404 as now to be described will release all of the keys of the keyboard 1 as well as of the key board 5 that may have theretofore been depressed. In order thus to release the keys of the key boards 1 and 5 the solenoid 206 and relay 216 must be energized as is the case when completing any posting operation. In other words, the circuit will then be established starting with the negative low voltage lead 48 and passing down through the conductor 47 to the relay 216, then the conductor 209 to the conductor 208, to the conductor 407, switch 404, then conductor 406 to the conductor 210, to conductor 38, back to positive low voltage lead 39. At the same time the circuit for the solenoid 206 will be established, in this case again starting with the negative low voltage lead 48, then to the conductor 47, to the conductor 205, to the solenoid 206, to the conductor 407, to the switch 404, and then the conductor 406, to the conductor 210, conductor 38 and positive low voltage lead 39.

The reverse switch is then used to reduce high quotations, or to raise low quotations erroneously posted, and the open key to correct the opening quotations, all as heretofore described.

In order to effect one or more corrections as aforesaid, without re-selecting the stock previously selected, there is provided the manually operable switch 408 which when operated will interrupt the current passing through the lead 209, thereby to prevent the operation of the holding relay 216, in turn to prevent releasing the keys of the previously selected stock.

I claim:

1. The combination of a display board having a plurality of groups of display areas, a driven shaft and a set of movable electric contacts for each area, a group of information display wheels operatively mounted on each driven shaft, a common drive shaft, clutches for drivingly connecting said drive shaft with said driven shafts one at a time, a first control board operatively connected to said clutches and to said movable contacts to select a predetermined driven shaft for rotation and to select and close its associated set of electric contacts, a motor, a reversible clutch for drivingly connecting said drive shaft with the said motor, a second control board, solenoid control means, when energized, operatively connecting such reversible clutch to effect the operation and direction of operation of said drive shaft in either direction, and electrical means operatively connecting said second control board, when actuated, with the set of movable contacts of the display wheels selected in turn to select the information to be displayed by said wheels and also with said solenoid control means.

2. The combination of a display board having a plurality of groups of display areas, a driven shaft and a set of movable electric contacts for each area, a group of information display wheels for each area, a first control board common to all areas, means for electrically connecting said first control board with said areas to select one of said areas at a time for operation and to actuate its associated electric contacts, a common drive shaft, means for drivingly connecting said drive shaft with said driven shafts one at a time, a motor, a reversible clutch to drivingly connect said motor to actuate said drive shaft in either direction, a second control board common to all display areas operatively connected to said display wheels to select the information to be displayed, and solenoid control means operatively connected to said second control board and to said reversible clutch to initiate the actuation of the group of display wheels selected for rotation in either direction upon the actuation of said second control board.

3. The combination of a display board having a plurality of columns of display areas, the display areas of the several columns being in alinement with one another to form a plurality of transverse rows of display areas, a group of information display wheels for each area rotatable to display various information according to the peripheral surface of the wheels being displayed, a horizontal driven shaft for the display wheels of each area, an intermediate vertical shaft for each column of display wheels, a horizontal drive shaft, a clutch for drivingly connecting each driven shaft with one of said intermediate shafts, a second clutch for drivingly connecting each intermediate shaft with said drive shaft, a motor, a reversible clutch to drivingly connect said motor to actuate said drive shaft in either direction, a first control board common to all areas, means including movable contacts for operatively connecting said first control board with the clutches between said driven shafts and said intermediate shafts to select one of the groups of display wheels for actuation, and a second control board common to all display areas operatively connected to said display wheels through said movable contacts to select the information to be displayed and operatively connected to said reversible clutch to initiate the actuation of the group of display wheels selected for rotation in either direction after said first control board has been operated.

4. The combination of a display board having a plurality of columns of display areas, the display areas of the several columns being in alinement with one another to form a plurality of transverse rows of display areas, a group of information display wheels for each area rotatable to display various information according to the peripheral surface of the wheels being displayed, a horizontal driven shaft for the display wheels of each area, an intermediate vertical shaft for each column of display wheels, a horizontal drive shaft, a clutch for drivingly connecting each driven shaft with one of said intermediate shafts, a second clutch for drivingly connecting each intermediate shaft with said drive shaft, a motor, a reversible clutch to drivingly connect said motor to actuate said drive shaft in either direction, a first control board common to all areas, means including solenoids for actuating said clutches, means including relays electrically connected to said first control board for closing electrical circuits through the solenoids selected in turn to select one of the groups of display wheels for actuation, a second control board common to all display areas, and means including relays electrically connected to said second control board to select the information to be displayed and to actuate said reversible clutch to initiate the actuation of the group of display wheels selected for rotation in either direction after said first control board has been operated.

5. The combination of a display board having a plurality of groups of display areas, a driven shaft for each area, a group of information display wheels operatively mounted on each driven shaft, a common drive shaft, means for drivingly connecting said drive shaft with said driven shafts one at a time, a first control board operatively connected to select a predetermined driven shaft for rotation, a motor, a reversible clutch for drivingly connecting said drive shaft with said motor, a second control board operatively connecting said reversible clutch to effect the rotation of said drive shaft in either direction, and electrical means operatively connecting said second control board with the display wheels selected in turn to determine the rotation of the display wheels selected according to the information to be displayed by said wheels, said electrical means including a control switch, two circuits each including a relay and a set of resistances, one set corresponding to the present or last position of the display wheels and the other set corresponding to the new position of the display wheels, one set of said resistances approaching in intensity the intensity of the other set of resistances as the display wheels rotate from the last position to the new position, the relays in said circuits opposing one another and freeing said switch when the intensity in the two resistances is equalized and the display wheels have rotated to the new position thereby to interrupt the current and bring the display wheels to rest.

6. The combination of a display board having a plurality of groups of display areas, a driven shaft for each area, a group of information display wheels operatively mounted on each driven shaft, a common drive shaft for drivingly connecting said drive shaft with said driven shafts one at a time, a first control board operatively connected to select a predetermined driven shaft for rotation, a motor, a reversible clutch for drivingly connecting said drive shaft with said motor, a second control board operatively connecting said reversible clutch to effect the rotation of said drive shaft in either direction, and electrical means operatively connecting said second control board with the display wheels selected in turn to select the information to be displayed by said wheels, said electrical means including two sets of resistances, one corresponding to the present or last position of the display wheels and the other set corresponding to the new position of the display wheels, said resistances cooperating to determine the distance of rotation of the display wheels from the last position to the new position, said second control board including a plurality of rows of keys, one row for one of the display wheels of each group, slip rings on said display wheels, brushes to contact said rings, electric conductors connecting said brushes with one set of said resistances corresponding to the number or data being displayed, and the keys of said second control board being electrically connected to the other set of resistances.

7. The combination of a display board having a plurality of groups of display areas, a group of information display wheels for each area, a first control board common to all areas, means including movable contacts for electrically connecting said first control board with said areas to select one of said areas at a time for operation, the movable contacts of an area being actuated into circuit making position whenever such area is selected, a motor, means for drivingly connecting said motor to any of the groups of display wheels selected by said first control board, and a second control board common to all display areas operatively connected to said display wheels to select the information to be displayed and operatively connected to said connecting means to initiate the actuation of the group of display wheels of the area selected, said first control board including three keyboards, each including a set of predetermined letters or symbols, the selection of a display area not being effected until one key of each of said keyboards has been depressed.

8. The combination of a stock quotation display board having a plurality of groups of display areas, a driven shaft for each area, a group of sets of quotation wheels operatively mounted on each driven shaft, one set for displaying the "last" quotation, a set for displaying the "high" quotation, and another set for displaying the "low" quotation for a predetermined trading period, a common drive shaft, means for drivingly connecting said drive shaft with said driven shafts one at a time, a first control board operatively connected to select a predetermined driven shaft for rotation, a motor, a reversible clutch for drivingly connecting said drive shaft with said motor, a second control board operatively connecting said reversible clutch to effect the rotation of said drive shaft in either direction, electrical means operatively connecting said second control board with the "last" quotation wheels selected in turn to determine the rotation of the display wheels selected according to the information to be displayed by said wheels, said electrical means including a control switch, two circuits each including a relay and a set of resistances, one set corresponding to the present or last position of the "last" quotation wheels, and the other set corresponding to the new quotation, one set of said resistances approaching in intensity the intensity of the set of resistances as the "last" quotation wheels rotate from the last position to the new position whether to post a higher or lower price, means operatively connecting said "low" quotation wheels with its driven shaft for actuation only when the quotation posted is lower than that then appearing on the "low" quotation wheels, and means operatively connecting said "high" quotation wheels with its driven shaft for actuation only when the quotation posted is higher than that then appearing on the "high" quotation wheels, the relays in said circuits opposing one another and freeing said switch when the intensity in the two resistances is equalized and the display wheels have rotated to the new position thereby to interrupt the current and bring the display wheels to rest.

9. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said driven shaft with said "low" quotation wheels after the initial quotation has been posted only when any subsequent quotation is lower in price than a previous "low" quotation for the trading period, means for drivingly connecting said "high" quotation wheels with the driven shaft to be actuated only when any subsequent quotation after the opening quotation is higher than a previous high quotation for the trading period, the means for drivingly connecting the "low" quotation wheels including hubs mounted on said driven shaft and interposed between each of the wheels of said "low" quotation wheels and said driven shaft, the hub of the low denomination wheel of said "low" quotation wheels being fixed to said driven shaft, gears for connecting said low denomination hub to higher denomination hubs, gears for connecting said low denomination wheel to higher denomination wheels, means for resiliently anchoring said low denomination hub to said low denomination wheel when said low denomination wheel has been released, and means for anchoring said low denomination wheel against rotation with its hub until a quotation is posted which is lower than any previous low quotation for the trading period.

10. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, means for drivingly connecting said "high" quotation wheels with the driven shaft only when any subsequent quotation after the opening quotation is higher than a previous high quotation for the trading period, the means for drivingly connecting the "high" quotation wheels including hubs mounted on said driven shaft and interposed between each of the wheels of said "high" quotation wheels and said driven shaft, the hub of the low denomination wheel of said "high" quotation wheels being fixed to said driven shaft, gears for connecting the low denomination hub to higher denomination hubs, gears for connecting said low denomination wheel to higher denomination wheels, means for resiliently anchoring said low denomination hub to said low denomination wheel when said low denomination wheel has been released, and means for anchoring said low denomination wheel against rotation with its hub until a quotation is posted which is higher than any previous high quotation for the trading period.

11. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, means for drivingly connecting said "high" quotation wheels with its driven shaft to the actuated only when any subsequent quotation after the opening quotation is higher than a previous high quotation for the trading period, a hub mounted on said driven shaft and interposed between the "open" quotation wheels and said driven shaft, said hub being fixed to said driven shaft, gears for connecting the low denomination wheel to the higher denomination wheels on said "open" quotation set, means for resiliently anchoring said hub to the low denomination wheel when said low denomination wheel has been released, and means for anchoring said low denomination wheel against rotation with its hub throughout the trading period after the open quotation has been posted.

12. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period; means for drivingly connecting said "high" quotation wheels with its driven shaft to be actuated only when any subsequent quotation after the opening quotation is higher than a previous high quotation for the trading period, the means for drivingly connecting the driven shaft with the "last" quotation wheels including a low denomination wheel for the "last" quotation wheels being fixed to its driven shaft, higher denomination wheels for the "last" quotation wheels being free to rotate on their driven shaft, gears for connecting said low denomination wheel to said higher denomination wheels to post increasing or decreasing values on the higher or lower denomination wheel when carrying over from a lower or higher denomination wheel, respectively, a control board having a plurality of keyboards, one keyboard for each "last" quotation wheel, slip rings on said "last" quotation wheels, and brushes engaging said slip rings, the brushes of each "last" quotation wheel being electrically connected to its keyboard.

13. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, means for drivingly connecting said "high" quotation wheels with its driven shaft to be actuated only when any subsequent quotation after the opening quotation is higher than a previous high quotation for the trading period, the means for drivingly connecting the driven shaft with the "last" quotation wheels including a low denomination wheel for the "last" quotation wheels being fixed to its driven shaft, higher denomination wheels for the "last" quotation wheels being free to rotate on their driven shaft, gears for connecting said low denomination wheel to said higher denomination wheels to post increasing or decreasing values on the higher or lower denomination wheel when carrying over from a lower or higher denomination wheel, respectively, a control board having a plurality of keyboards, one keyboard for each "last" quotation wheel, slip rings on said "last" quotation wheels, brushes engaging said slip rings, the brushes of each "last" quotation wheel being electrically connected to its keyboard, said electrical means including a control switch, two circuits each including a relay and a set of resistances, one set corresponding to the present or last position of the "last" quotation wheels and the other set corresponding to a new quotation, one set of said resistances approaching in intensity the intensity of the other set of resistances as the "last" quotation wheels rotate from the last position to the new position whether to post a higher or lower quotation, the relays in said circuits opposing one another and freeing said switch when the intensity in the two resistances is equalized and the display wheels have rotated to the new position thereby to interrupt the current and bring the display wheels to rest.

14. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, means for drivingly connecting said "high" quotation wheels with its driven shaft to be actuated only when any subsequent quotation after the opening quotation is higher than a previous high quotation for the trading period, the means for drivingly connecting the "low" quotation wheels including hubs mounted on said driven shaft and interposed between each of the wheels of said "low" quotation wheels and said driven shaft, the hub of the low denomination wheel of said "low" quotation wheels being fixed to said driven shaft, gears for connecting said low denomination hub to higher denomination hubs, gears for connecting said low denomination wheel to higher denomination wheels, means for resiliently anchoring said low denomination hub to said low denomination wheel when said low denomination wheel has been released, and means for anchoring said low denomination wheel against rotation with its hub until a quotation is posted which is lower than any previous low quotation for the trading period, means for electrically initiating the actuation of said "low" quotation wheels, said electrical means including an annular slip ring and an associated contact on each hub of said "low" quotation set, brushes mounted in each wheel of said "low" quotation set and cooperating with the contact of its associated hub and the slip ring of an adjacent hub to establish a circuit across the "low" quotation wheels when its driven shaft actuates the hubs of said "low" quotation set to the low quotation posted on said wheels.

15. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, and means for drivingly connecting said "high" quotation wheels with its driven shaft to be actuated only when any subsequent quotation after the opening quotation is higher than a previous high quotation for the trading period, the means for drivingly connecting the "high" quotation wheels including hubs mounted on said driven shaft and interposed between each of the wheels of said "high" quotation wheels and said driven shaft, the hub of the low denomination wheel of said "high" quotation wheels being fixed to said driven shaft, gears for connecting the low denomination hub to higher denomination hubs, gears for connecting said lower denomination wheel to higher denomination wheels, means for resiliently anchoring said low denomination hub to said low denomination wheel when said low denomination wheel has been released, and means for anchoring said low denomination wheel against rotation with its hub until a quotation is posted which is higher than any previous high quotation for the trading period, means for actuating said latter anchoring means to release the low denomination wheel of said "high" quotation wheels, said latter actuating means including an annular slip ring and an associated contact on the hub of each "high" quotation wheel, and brushes mounted in each "high" quotation wheel cooperating with a contact of its associated hub and the slip ring of an adjacent hub to establish a circuit through said "high" quotation wheels when the new quotation being posted is higher than any previous "high" quotation for the trading period.

16. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, means for drivingly connecting said "high" quotation wheels with its driven shaft to be actuated only when any subsequent quotation after the opening quotation is higher than a previous high quotation for the trading period, a hub mounted on said driven shaft and interposed between the "open" quotation wheels and said driven shaft, said hub being fixed to said driven shaft, gears for connecting the low denomination wheel to the higher denomination wheels on said "open" quotation set, means for resiliently anchoring said hub to the low denomination wheel when said low denomination wheel has been released, means for anchoring said low denomination wheel against rotation with its hub throughout the trading period after the open quotation has been posted, and means for actuating said latter anchoring means to release the low denomination wheel of said "open" quotation set, said actuating means including a switch electrically connected to said latter anchoring means.

17. The combination of a stock quotation display board having a plurality of groups of display areas, a driven shaft for each area, a group of sets of quotation wheels operatively mounted on each driven shaft, one set for displaying the "last" quotation, a second set for displaying the "low" quotation, a third set for displaying the "high" quotation, and a fourth set for displaying the "open" quotation for a predetermined trading period, means for operatively connecting the four sets of a group to rotate with its shaft to post the "open" quotation at the beginning of a trading period, means for thereupon anchoring the "open" quotation wheels against rotation for the remainder of the trading period, means for drivingly connecting the driven shaft with the "last" quotation wheels for posting each new quotation, means for drivingly connecting said "low" quotation wheels after the initial quotation has been posted only when any subsequent quotation is lower in price than a previous "low" quotation for the trading period, and means for drivingly connecting said "high" quotation wheels with its driven shaft to be actuated only when any subsequent quotation after the opening quotation is higher than a previous high quotation for the trading period, means for actuating said driven shaft a reversing switch electrically connected to said actuating means to enable reversing the rotation of said "low" quotation wheels and "high" quotation wheels to effect a correction, and a manually operated switch to operatively connect said open, high and low quotation sets to said driven shaft to effect a correction.

WARREN THORPE.

REFERENCES CITED

The following references are of record in the file of this patent:

UNITED STATES PATENTS

| Number | Name | Date |
|---|---|---|
| 1,952,513 | Reynolds | Mar. 27, 1934 |
| 2,134,118 | Foss | Oct. 25, 1938 |
| 2,181,682 | Scheidegger | Nov. 28, 1939 |
| 1,514,353 | Thomas | Nov. 4, 1924 |
| 2,264,563 | Bumstead | Dec. 2, 1941 |
| 2,200,802 | Morton | May 14, 1940 |